United States Patent
Farber et al.

(10) Patent No.: US 10,970,954 B2
(45) Date of Patent: Apr. 6, 2021

(54) MOVABLE BARRIER OPERATOR REGISTRATION VERIFICATION

(71) Applicant: The Chamberlain Group, Inc., Oak Brook, IL (US)

(72) Inventors: Jordan Ari Farber, Oak Brook, IL (US); James Scott Murray, Glendale Heights, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 34 days.

(21) Appl. No.: 16/560,174

(22) Filed: Sep. 4, 2019

(65) Prior Publication Data

US 2020/0082652 A1    Mar. 12, 2020

Related U.S. Application Data

(60) Provisional application No. 62/728,721, filed on Sep. 7, 2018.

(51) Int. Cl.
*G07C 9/38* (2020.01)
*E05F 15/77* (2015.01)
(Continued)

(52) U.S. Cl.
CPC ............ *G07C 9/38* (2020.01); *E05F 15/59* (2015.01); *E05F 15/77* (2015.01);
(Continued)

(58) Field of Classification Search
CPC .. G07C 9/38; G07C 2009/00928; E05F 15/77
(Continued)

(56) References Cited

U.S. PATENT DOCUMENTS

| 8,643,465 B2 * | 2/2014 | Fitzgibbon | H04L 63/10 340/5.64 |
| 2017/0041316 A1 * | 2/2017 | Setchell | H04W 4/80 |

(Continued)

FOREIGN PATENT DOCUMENTS

WO    2018097993    5/2018

OTHER PUBLICATIONS

How to connect a MyQ Wi-Fi garage door opener to a home Wi-Fi network: First published on Mar. 10, 2017; https://support.chamberlaingroup.com/s/article/How-to-connect-MyQ-Wi-Fi-garage-door-opener-to-WiFi-home-network.

(Continued)

*Primary Examiner* — Kam Wan Ma
(74) *Attorney, Agent, or Firm* — Fitch, Even, Tabin & Flannery LLP

(57) ABSTRACT

Systems, methods, and apparatus for managing and controlling network-enabled movable barrier operators is provided. A method for managing network-enabled movable barrier operator includes receiving a user account identifier and a movable barrier operator identifier from a user device, providing an instruction to perform a specified action with a movable barrier operator associated with the movable barrier operator identifier to the user device, determining a registration condition is met upon detecting that the specified action has been performed, and, upon the registration condition being met, associating the movable barrier operator identifier with the user account identifier to allow a user account associated with the user account identifier to control the movable barrier operator over a network.

14 Claims, 4 Drawing Sheets

(51) Int. Cl.
  *E05F 15/59* (2015.01)
  *H04W 12/00* (2021.01)
  *G07C 9/00* (2020.01)
(52) U.S. Cl.
  CPC ... *H04W 12/00522* (2019.01); *E05Y 2400/32* (2013.01); *E05Y 2900/106* (2013.01); *G07C 2009/00928* (2013.01)
(58) Field of Classification Search
  USPC .......................................................... 340/5.2
  See application file for complete search history.

(56) References Cited

U.S. PATENT DOCUMENTS

| | | | |
|---|---|---|---|
| 2017/0175433 A1* | 6/2017 | Kang | G06Q 10/1097 |
| 2017/0236354 A1* | 8/2017 | Baker | G07C 9/00309 340/5.71 |
| 2019/0085615 A1 | 3/2019 | Cate | |

OTHER PUBLICATIONS

How to Connect a Wi-Fi Garage Door Opener to Your Home Network: First published on Apr. 13, 2018, htttps://support.chamberlaingroup.com/s/article/How-To-Connect-A-Wi-Fi-Garage-Door-Opener-To-Your-Home-Network.

Non-Patent Literature Document Disclosing YouTube Video entitled "Open your garage door with a smart phone! How to setup LIftmaster MyQ connectivity setup iphone" https://www.youtube.com/watch?v=liAdgQUqG-M; published Nov. 29, 2017; Disclosing Screen Captures and Audio Transcription.

Non-Patent Literature Document; Disclosing YouTube Video entitled "How to install a Chamberlain Garage Door Opener—Part 2 Wifi Setup" https://www.youtube.com/watch?v=14C1-ApeFDQ; published Jun. 23, 2018; Disclosing Screen Captures and Audio Transcription.

* cited by examiner

MOVABLE BARRIER OPERATOR REGISTRATION VERIFICATION

CROSS-REFERENCE TO RELATED APPLICATION

This application claims the benefit of U.S. Provisional Patent Application No. 62/728,721, filed Sep. 7, 2018, which is hereby incorporated by reference in its entirety herein.

TECHNICAL FIELD

The present disclosure relates generally to movable barrier operators, and more specifically to registration of network-enabled moveable barrier operators.

BACKGROUND

Movable barriers are known, including, but not limited to, single and segmented garage doors, pivoting and sliding doors and cross-arms, rolling shutters, and the like. In general, a moveable barrier operator system for controlling such a movable barrier includes a movable barrier operator coupled to a corresponding barrier and configured to cause the barrier to move (typically between closed and opened positions).

Conventionally, movable barrier operators are operated by wired controls and/or radio frequency (RF) remote controls. Network-enabled (or network-connected) movable barrier operators are a new type of barrier operators that can also be controlled over a network or networks, such as a wired or wireless local area network, the Internet etc., by a user device such as a smartphone or a personal computer.

SUMMARY

Systems, methods, and apparatuses for managing and controlling network-enabled movable barrier operators are described herein. One example method includes receiving a user account identifier and a movable barrier operator identifier from a user device, providing an instruction to the user device to perform a specified action with a movable barrier operator associated with the movable barrier operator identifier, determining a registration condition is met upon detecting that the specified action has been performed and, in the event that the registration condition is met, associating the movable barrier operator identifier with the user account identifier to allow control of the movable barrier operator over a network via the user account associated with the user account identifier.

Prior to controlling a network-enabled movable barrier operator with a user device over a network, an association is established between the movable barrier operator and a user account. In one aspect of the present disclosure, an additional verification operation is provided to ensure that the correct movable barrier identifier is entered during the registration process. For example, a user may be instructed to perform an action to verify that the user has physical access to the movable barrier operator and/or is in close proximity to the movable barrier operator associated with the entered identifier. This additional verification operation prevents the user from inadvertently registering a movable barrier operator installed at a different location. In another aspect of the present disclosure, the verification operation is satisfied by the movable barrier operator establishing a connection with a server within a predetermined timeframe prior to receiving the movable barrier operator identifier. This verification operation may be performed instead of or in addition to the user performing an action to verify the user has physical access to the movable barrier operator.

Figure 1:
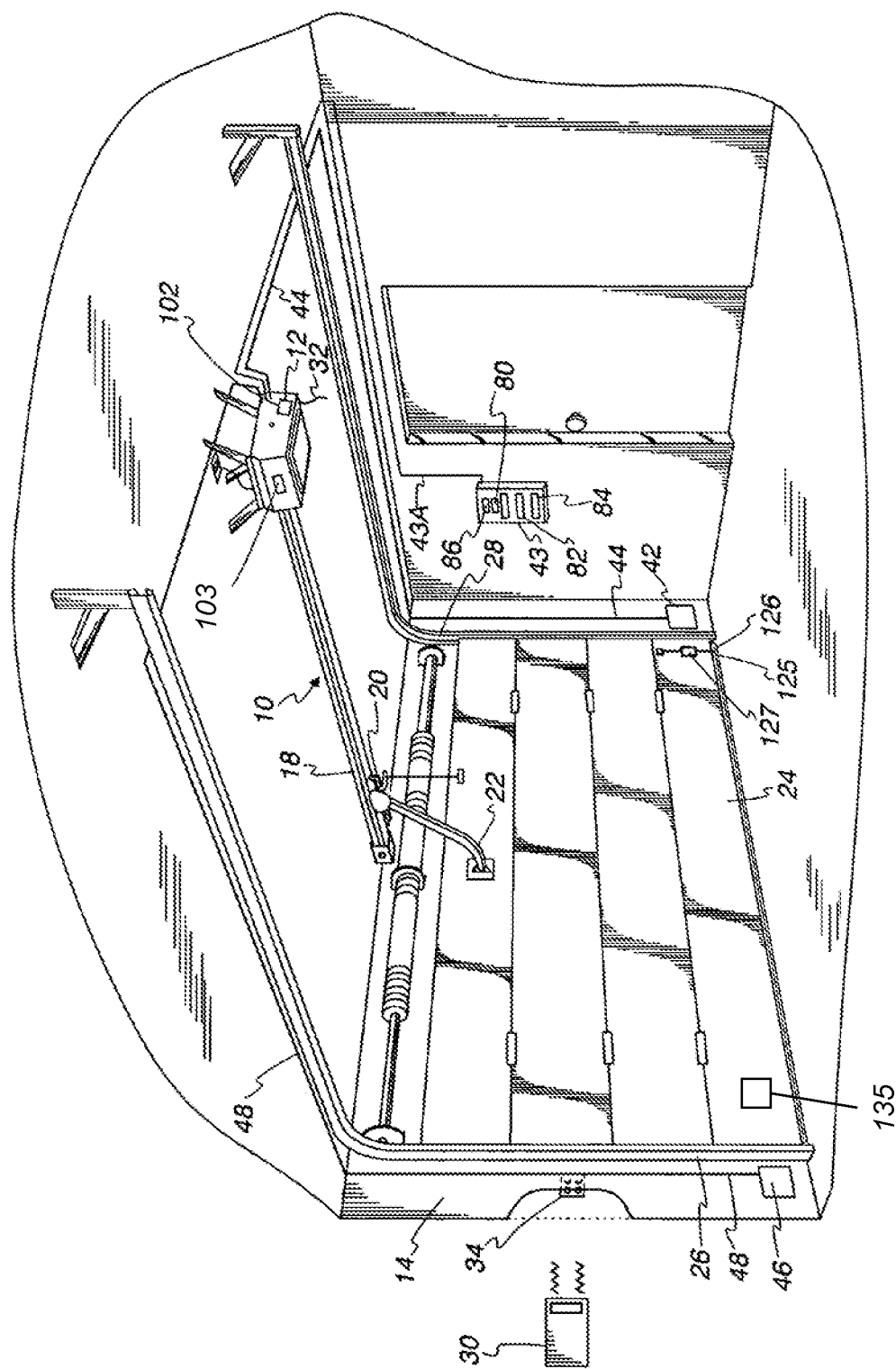
FIG. 1 is a perspective view of a garage having mounted within it a garage door opener.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will be further be appreciated that certain actions and/or operations may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring now to the drawings and especially to FIG. 1, a movable barrier operator, such as a garage door opener system, is provided which includes a garage door opener 12

(also referred to herein as a "head unit") mounted within a garage 14. More specifically, the garage door opener system 10 includes a rail 18 with a releasable trolley 20 attached having an arm 22 extending to a multiple paneled garage door 24 positioned for movement along a pair of door tracks 26 and 28. The system 10 includes one or more remote controls, such as a hand-held or portable transmitter unit 30, configured to send signals to an antenna 32 of the garage door opener 12. The antenna 32 receives wireless signals from the one or more remote controls. The wireless signals include a state change request which causes the garage door opener 12 to move the garage door 24. The hand-held transmitter 30 is generally a portable transmitter unit that travels with a vehicle and/or a human user. The one or more remote controls may include an external control pad transmitter 34 positioned on the outside of the garage having a plurality of buttons thereon and communicates via radio frequency transmission with the antenna 32 of the garage door opener 12. An optical emitter 42 is connected via a power and signal line 44 to the head unit. An optical detector 46 is connected via a wire 48 to the garage door opener 12. The optical emitter 42 and the optical detector 46 comprise a safety sensor of a safety system for detecting obstruction when the garage door 24 is closing. In another embodiment, the optical emitter 42 and/or optical detector 46 communicate with the garage door opener 12 using wireless approaches.

The garage door opener 12 may further include communication circuitry 102 configured to connect to a wide-range network such as the Internet via a local area wired or wireless (e.g., Wi-Fi) access point or router in the residence associated with the garage 14. In some embodiments, the communication circuitry 102 may broadcast a wireless signal similar to a Wi-Fi router to allow a user device (e.g. smartphone, PC) to connect to a controller 103 of the garage door opener 12 via the communication circuitry 102 to facilitate setup or otherwise configure the garage door opener 12. For example, after a user device is wirelessly connected to the garage door opener 12, the user interface of the user device may be used to select a Wi-Fi network (e.g. SSID) and input a network password to allow the garage door opener 12 to connect to the internet via the Wi-Fi router in the residence associated with the garage 14. In some embodiments, the garage door opener 12 may provide its specifications and status information to a server via the communication circuitry 102. In some embodiments, the garage door opener 12 may receive operation commands such as status change commands from a user device over a network via the server. In some embodiments, the communication circuitry 102 may further comprise a short-range transceiver such as a Bluetooth transceiver for pairing with a user device during setup and receiving configurations (e.g. Wi-Fi settings) from the user device.

The garage door 24 has a conductive member 125 attached. The conductive member 125 may be a wire, rod or the like. The conductive member 125 is enclosed and held by a holder 126. The conductive member 125 is coupled to a sensor circuit 127. The sensor circuit 127 transmits indications of obstructions to the garage door opener 12. If an obstruction is detected, the garage door opener 12 can reverse the direction of the travel of the garage door 24. The conductive member 125 may be part of a safety system also including the optical emitter 42 and the optical detector 46.

The one or more remote controls may include a wall control panel 43 connected to the garage door opener 12 via a wire or line 43A. The wall control panel 43 includes a decoder, which decodes closures of a lock switch 80, a learn switch 82 and a command switch 84. The wall control panel 43 also includes a light emitting diode 86 connected by a resistor to the line 43A and to ground to indicate that the wall control panel 43 is energized by the garage door opener 12. Switch closures are decoded by the decoder, which sends signals along line 43A to the controller 103 coupled to an electric motor positioned within the garage door opener 12. In other embodiments, analog signals may be exchanged between wall control panel 43 and garage door opener 12.

The wall control panel 43 is placed in a position such that a user can observe the garage door 24. In this respect, the wall control panel 43 may be in a fixed position. However, it may also be moveable as well. The wall control panel 43 may also use a wirelessly coupled connection to the garage door opener 12 instead of the line 43A. If an obstruction is detected, the direction of travel of the garage door 24 may be reversed by the controller 103.

The garage door opener system 10 may include one or more sensors to determine the status of the garage door 24. For example, the garage door opener system 10 may include a tilt sensor 135 mounted to the garage door 24 to detect whether the garage door 24 is vertical (closed) or horizontal (open). Alternatively or additionally, the one or more sensors may include a rotary encoder that detects rotation of a transmission component of the garage door opener 12 such that the controller 103 of the garage door opener 12 may keep track of the position of the garage door 24.

While a garage door is illustrated in FIG. 1, the systems and methods described herein may be implemented with other types of movable barriers such as slide gates, swing gates, barrier arms, driveway gates, and the like. In some embodiments, one or more components illustrated in FIG. 1 may be omitted.

Figure 2:
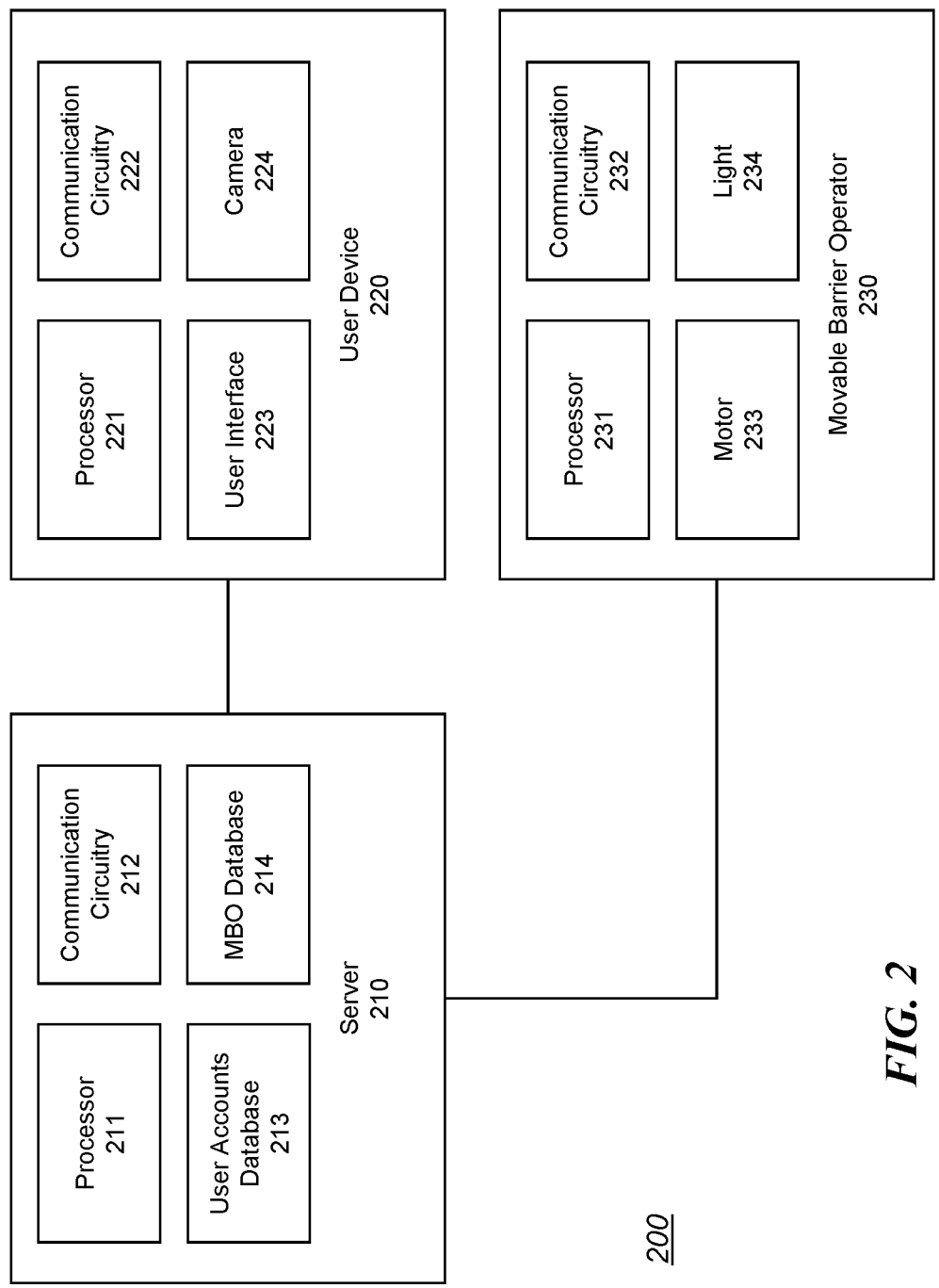
FIG. 2 is a block diagram of a system for managing network-enabled movable barrier operators.

FIG. 2 is a block diagram in of a system 200 including a server 210, a movable barrier operator 230, and a user device 220. The server 210 generally comprises a processor-based device that may communicate with a plurality of user devices 220 and a plurality of movable barrier operators 230 to manage the movable barrier operators 230 in the system. The server 210 comprises a processor 211, communication circuitry 212, a user account database 213 storing information regarding user accounts, and a movable barrier operator (MBO) database 214. The processor 211 may comprise one or more of a central processing unit (CPU), a microprocessor, a microcontroller, an application specific integrated circuit (ASIC) and the like. The processor 211 is configured to execute a set of computer-readable instructions stored on a memory to provide a registration process for associating user accounts with movable barrier operators. The processor 211 is further configured to relay status information and commands between user devices and movable barrier operators to allow users to control and/or monitor status of movable barrier operators 230 over a network. In some embodiments, the processor 211 is configured to perform one or more operations described with reference to FIG. 3 and FIG. 5 herein.

The communication circuitry 212 generally comprises circuitry configured to connect the processor 211 to a network and exchange messages with user devices and movable barrier operators. In some embodiments, the server 210 may further be configured to use the communication circuitry 212 to exchange movable barrier operator information and command with third party service providers such as home security services, smart home systems, home automation systems, and the like. In some embodiments, the communication circuitry 212 may comprise one or more a network adapter, a network port, a network modem, a router, a network security device, and the like.

The user account database 213 comprises a computer-readable memory storing user account information. Each user account record may comprise a user account identifier, log-in credential (e.g. user name/ID and password), and associated movable barrier operator identifier(s) (e.g. serial number(s)). In some embodiments, the user account database may further store other user information such as email, phone number, physical address, associated internet protocol (IP) address, verified user devices, account preferences, linked third-party service (e.g. home security service, smart home systems) accounts, and the like.

The MBO database 214 comprises a computer-readable memory storing status of movable barrier operators 230 managed by the system. In some embodiments, the MBO database 214 may record parameter and/or status information (e.g. open, closed, opening, closing) associated with a plurality of unique MBO identifiers. In some embodiments, the MBO database 214 may include an entry for each unique MBO identifier issued by a manufacturer/supplier. The MBO database 214 may record MBO specification information such as MBO type, MBO model, MBO serial number, etc. The MBO database 214 may further track whether an MBO has established a connection with the server 210 since the MBO left the factory, when the connection was initially established, whether the connection is currently active, each MBO's IP address, and the like. In some embodiments, the movable barrier operators 230 in the MBO database 214 may or may not be associated with a user account. In some embodiments, a movable barrier operator 230 may provide a limited set of information (e.g. specification, connection status) to the server 210 prior to being linked to a user account. In some embodiments, the MBO database 214 may further track the operations and statuses of an MBO over time. For example, the MBO database 214 may record a history of each time the movable barrier is opened or closed, each time a light of a movable barrier operator 230 is turned on or off, etc. In some embodiments, MBO operations and status history information may be instead stored with the user account registered with the MBO identifier. In some embodiments, the user account database 213 and the MBO database 214 may be combined as a single database.

The user device 220 generally comprises an electronic device configured to allow a user to communicate with the server to register a movable barrier operator 230 and control the movable barrier operator 230 via the server. The user device 220 may comprise a mobile device, a smartphone, a tablet computer, a personal computer (PC), an internet of things (IoT) device, and the like. The user device 220 includes a processor 221, communication circuitry 222, a user interface 223, and a camera 224.

The processor 221 may comprise one or more of a central processing unit (CPU), a microprocessor, a microcontroller, an application specific integrated circuit (ASIC) and the like. The processor 221 is configured to execute a set of computer-readable instructions stored on a memory to, among other things, provide a graphical user interface for a user to register a movable barrier operator 230 with a user account and control the movable barrier operator 230 over a network. In some embodiments, the graphical user interface may be instantiated by a mobile application, a desktop application, a web-based user interface, a website, etc. and may be presented as an augmented reality image, a holographic image, a two-dimensional graphical user interface, and the like. In some embodiments, the processor 211 of the user device 220 is configured to perform one or more operations described with reference to FIG. 4 and FIG. 5 herein.

The communication circuitry 222 is configured to connect the user device 220 with the server 210 over a network. In some embodiments, the communication circuitry 222 may further be configured to communicate with the movable barrier operator 230. For example, a movable barrier operator 230 may broadcast a Wi-Fi signal through which the user device 220 may configure the movable barrier operator 230. The communication circuitry 222 may comprise one or more of a network adapter, a network port, a cellular network (3G, 4G, 4G-LTE, 5G) interface, a Wi-Fi transceiver, a Bluetooth transceiver, a mobile data transceiver, and the like.

The user interface 223 of the user device 220 comprises one or more user input/output devices. In some embodiments, the user interface 223 comprises one or more of a display screen, a touch screen, a microphone, a speaker, one or more buttons, a keyboard, a mouse, augmented reality display, a holographic display, and the like. The user interface 223 is generally configured to allow a user to interact with the information provided on the user device, such as a graphical user interface for registering and controlling movable barrier operators. In some embodiments, the user interface 223 on the user device 220 may comprise an optical sensor, such as a camera 224, configured to capture images and/or videos. In some embodiments, the camera 224 may be used to scan an optical code (e.g QR code, barcode) and/or text as input. For example, a user may use the camera 224 to capture a movable barrier operator identifier to register the movable barrier operator. In some embodiments, the camera 224 may be used to capture light emitted from a light bulb/LED of the movable barrier operator 230. The user device 220 may then transmit the captured light pattern (e.g. a series of blinks) to the server 210 as a method of verification.

The movable barrier operator 230 comprises an apparatus configured to actuate a movable barrier based on control signals. The movable barrier operator 230 includes a processor 231, communication circuitry 232, a motor 233, and a light 234. In some embodiments, the movable barrier operator 230 may include one or more other components such as those described with reference to FIG. 1 herein.

The processor 231 comprises one or more of a central processing unit (CPU), a microprocessor, a microcontroller, an application specific integrated circuit (ASIC) and the like. The processor 231 is configured to execute a set of computer-readable instructions stored on a computer-readable memory to control a movable barrier operator based on commands received from one or more remote controls such as a portable transmitter, a wall-mounted transmitter, an exterior key pad transmitter, a server, a user device, etc. In some embodiments, the processor 231 is further configured to establish communication with the server 210 and upload operation parameters and movable barrier status information to the server 210. In some embodiments, the processor 231 of the movable barrier operator 230 is configured to perform one or more operations described with reference to FIG. 5 herein.

The communication circuitry 232 is configured to connect the processor 231 of the movable barrier operator 230 with the server 210 over a network. In some embodiments, the communication circuitry 232 may further be configured to communicate directly or indirectly with the user device 220. For example, the movable barrier operator 230 may broadcast a Wi-Fi signal which the user device 220 may use to connect to the movable barrier operator 230 and configure the settings of the movable barrier operator 230. The communication circuitry 232 may comprise one or more of a network adapter, a network port, a Wi-Fi transceiver, a Bluetooth transceiver, and the like. The communication circuitry 232 may also include a radio frequency (RF) receiver for receiving RF control signals from the portable transmitter 30 and an exterior key pad transmitter. In some embodiments, the communication circuitry 232 may be integrated into the head unit of a garage door opener or the control box of other types of movable barrier operators. In some embodiments, the communication circuitry may be a separate unit that communicates with the processor of the movable barrier operator 230 via a wired or wireless (e.g. RF, Bluetooth) connection.

While one user device 220 and one movable barrier operator 230 are shown in FIG. 2, the server 210 may simultaneously communicate with a plurality of user devices 220 and with a plurality of movable barrier operators 230 to register and manage the movable barrier operators 230 in the system.

Figures 3, 4:
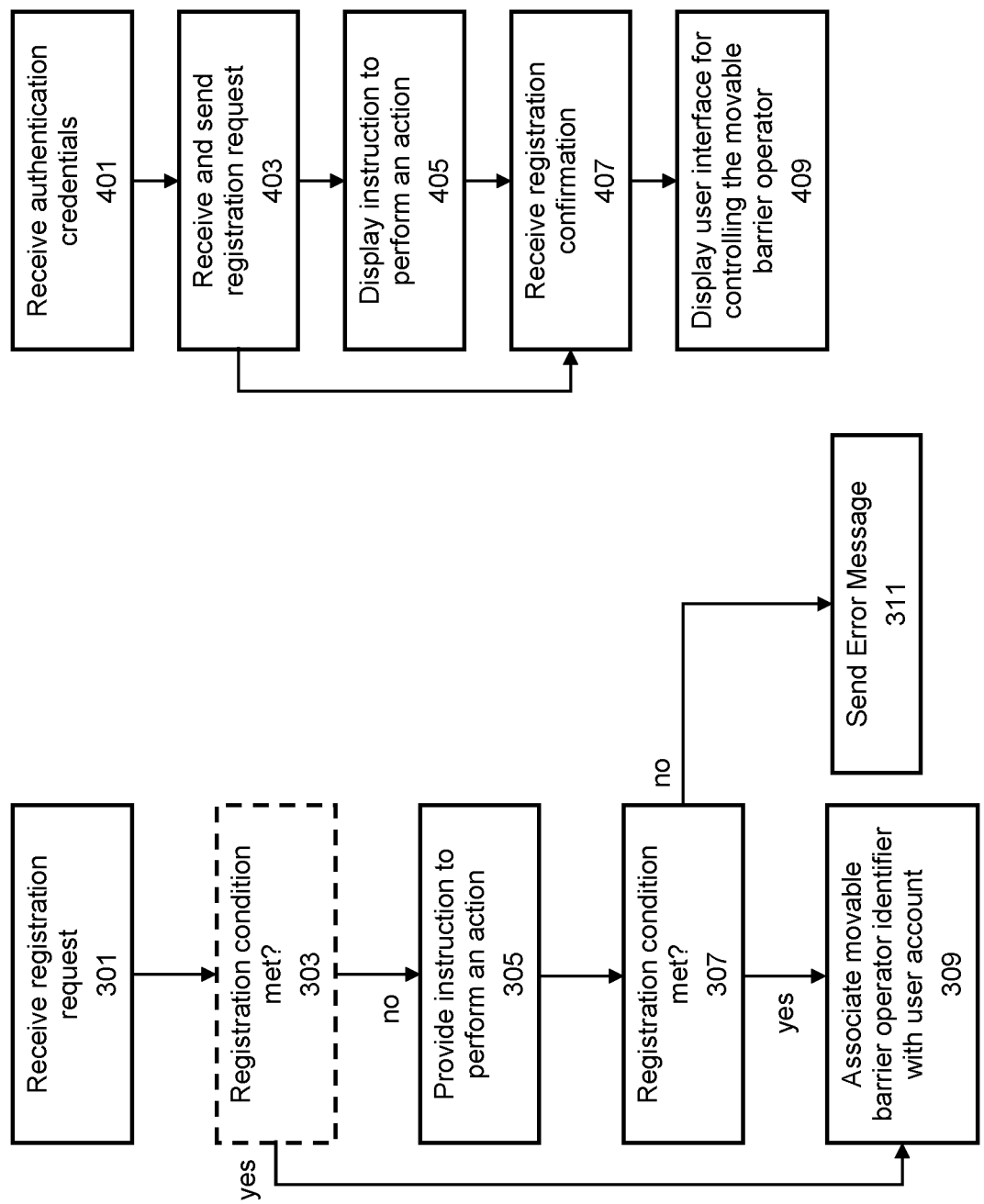
FIG. 3 is a flow diagram of a method for managing network-enabled movable barrier operators.
FIG. 4 is a flow diagram of a method for controlling a network-enabled movable barrier operator.

Next referring to FIG. 3 an example method for managing network-enabled movable barrier operators according to some embodiments is shown. In some embodiments, one or more of the operations in FIG. 3 may be performed by a server communicating with user devices and movable barrier operators. In some embodiments, one or more of the operations in FIG. 3 may be performed by the server 210 described with reference to FIG. 2.

Prior to the method shown in FIG. 3, a system implementing the method may require or otherwise specify that a user establish a user account and/or log into an existing user account. In block 301, the system receives a registration request for registering a movable barrier operator with the user account. In some embodiments, block 301 comprises receiving a user account identifier and a movable barrier operator identifier from a user device. In some embodiments, the registration request may comprise other information such as user device IP address, GPS location, etc.

In some embodiments, prior to block 303 and 305, the system may first determine whether the received movable barrier operator identifier is already registered to another user account. If the movable barrier operator identifier is already registered, the system may send an error message to the user device instead of proceeding to block 303 and/or block 305.

In some embodiments, a system may optionally perform block 303 and first determine whether one or more registration conditions are met prior to proceeding. In block 303, a registration condition may be met if the movable barrier operator established a connection with a server of the system within a predetermined time frame (e.g. 30 minutes, 1 hour) prior to receiving the movable barrier operator identifier in a registration request from the user device. For example, a user may install and set up a movable barrier operator by connecting the movable barrier operator to the internet via a Wi-Fi network. Once the movable barrier operator is connected to the internet, the movable barrier operator may send a message to the server indicating that the movable barrier operator has come online and/or is ready to be associated with a user account for control and/or monitoring of the movable barrier operator. The time window between the server receiving the initiating message from the movable barrier operator and receiving the registration request in block 301 may be used to determine whether the registration condition is met in block 303. The time window, duration or limit may be a predetermined time period, such as 30 or 60 minutes. If the registration condition is met, the system may skip over blocks 305 and 307 and proceed to associate the movable barrier operator identifier with the user account identifier to allow a user account associated with the user account identifier to control the movable barrier operator over a network in block 309. If the registration condition is not met in block 303, the method proceeds to block 305 and further action is required to register the movable barrier operator identifier with the user account. In embodiments that include block 303, a user may satisfy the registration condition in two ways. First, the registration condition may be met if a registration request is submitted within a predetermined time window of the movable barrier operator being connected to the server. Second, the registration condition may be met if the user performs the action specified in block 305 to show, demonstrate or prove that the user has physical access to the movable barrier operator associated with the entered movable barrier operator identifier. In some embodiments, block 303 may be omitted and the system may proceed directly to block 305 in response to receiving a registration request.

In block 305, the system provides an instruction, a request, or a prompt to perform a specified action with a movable barrier operator associated with the movable barrier operator identifier. In some embodiments, the content of the instruction may be stored on the user device and the server may trigger the display of the instruction in block 305. In some embodiments, the specified action comprises changing a state of a movable barrier coupled with the movable barrier operator. For example, the system may ask the user to open and/or close a garage door via actuation of a wall mounted transmitter remote control. In some embodiments, the specified action comprises changing a state of a light of the movable barrier operator. For example, the system may ask the user to switch the garage door opener's light on and/or off. In some embodiments, the specified action may comprise powering the movable barrier operator on or off. For example, the system may detect whether the network connection with the movable barrier operator has been terminated to determine whether the movable barrier operator has been turned off. In some embodiments, the specified action comprises using the user device to capture a light pattern produced by a light of the movable barrier operator. For example, the server may send a command to the movable barrier operator associated with the submitted movable barrier operator identifier to cause its light to blink on and off in a pattern. The system may then instruct the user to use a camera of the user device to capture a video of the light pattern. In some embodiments, the specified action comprises a sequence of actions. For example, the system may instruct the user to open and then close the garage door. In another example, the system may instruct the user to switch the light on and off for a set number of times.

In block 307, the system determines whether the registration condition is met based on detecting whether the specified action has been performed. In some embodiments, the specified action is detected by monitoring the status of the movable barrier operator over the network. For example, after sending the instruction in block 305, the server may monitor for status change messages from the movable barrier operator to determine whether the status change(s) matches the action specified in the instruction. In some embodiments, the system may set a time limit (e.g. 10 minutes, 20 minutes, etc.) in block 305 and the registration condition is met only if the action is completed within the time limit. In some embodiments, the specified action is detected by communicating with the user device. For example, if the user is instructed to capture a light pattern with their smartphone, light pattern data received from the user device may be used to determine whether the action has been performed.

If the registration condition is not met in block 307, the system sends an error message to the user device in block 311 to indicate that the registration was unsuccessful. In some embodiments, the process may return to block 305 to invite the user to reattempt registration and/or verified that the movable barrier operator identifier had been entered correctly.

If the registration condition is met in block 307, the system associates the movable barrier operator identifier with the user account identifier to allow a user account associated with the user account identifier to control the movable barrier operator over a network in block 309.

Next referring to FIG. 4, a method for controlling a network-enabled movable barrier operator according to some embodiments is shown. In some embodiments, the operations in FIG. 4 may be performed by a user device communicating with a server. In some embodiments, the operations in FIG. 4 may be performed by the user device 220 described with reference to FIG. 2. In some embodiments, the operations described in FIG. 4 may be performed via a graphical user interface of a mobile application, a desktop software program, a website, or the like.

In block 401, the user device receives an authentication credential for a user account. The authentication credential may comprise one or more of a user ID, password, passcode, PIN, and the like. In some embodiments, the user may register for a user account and/or log into their existing user account in block 401. The user device may communicate the authentication credential to a server and the server sends an authentication signal to the user device if the authentication credential is authorized.

In block 403, the user device receives a registration request via the user interface of the user device. In some embodiments, the registration request may comprise a user entering or scanning a movable barrier operator identifier to associate a movable barrier operator with the user account authenticated in block 401. The device then sends the registration request to the server. The registration request sent to the server comprises a user account identifier and the movable barrier operator identifier.

In some embodiments, after block 403, the user device may receive an instruction to perform a specified action in block 405 or a registration confirmation in block 407. For example, if the server determines that the registration condition is met without further actions from the user, the user device may receive a registration confirmation in response to sending the registration request, and block 405 may be omitted.

If the user device receives an instruction to perform a specified action with a movable barrier operator in response to sending the registration request in block 403, the process proceeds to block 405 and the instruction is displayed via the user interface. In some embodiments, the user interface may further display a time limit or countdown timer for completing the specified action. In some embodiments, after block 405, the device may wait for a registration confirmation message from the server in block 407. In some embodiments, the user device may be used to perform the specified action after block 405. For example, a user may use the camera of a mobile device to capture a light pattern from the light of the movable barrier operator.

In block 407, registration confirmation is received from the server. The registration confirmation is generally provided by the server in response to determining that the specified action has been performed. The device may further indicate the successful registration to the user via the user interface.

In block 409, the user device provides a graphical user interface (GUI) for the user to control the movable barrier operator registered with the user account. For example, the GUI may include an icon for opening/closing a garage door and an icon for turning on/off a garage door light. In some embodiments, the device may further receive movable barrier operator status information from the server and display the current status of the movable barrier via the GUI.

Figure 5:
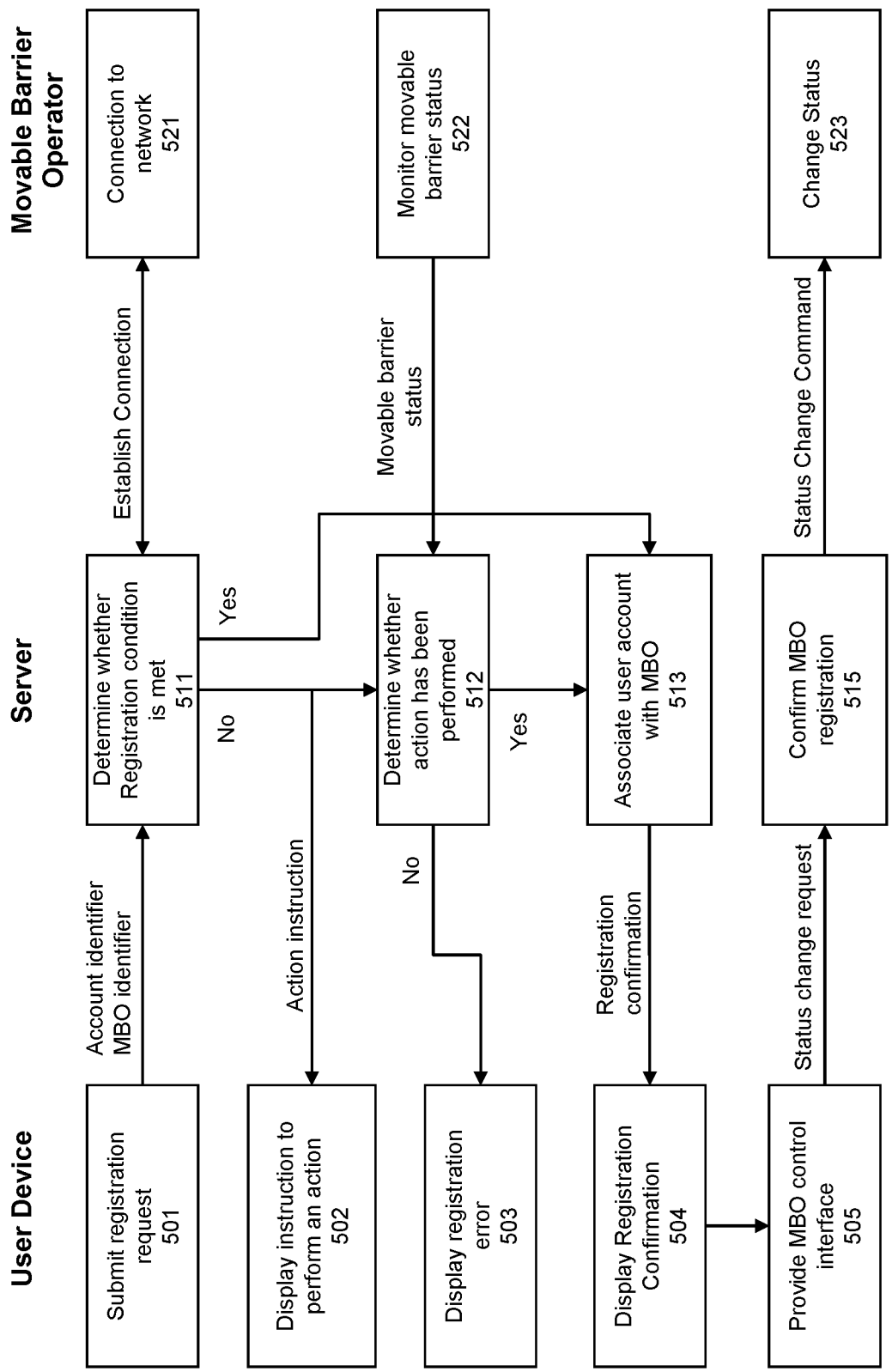
FIG. 5 is a flow diagram of a method for managing and controlling a network-enabled movable barrier operator.

Next referring to FIG. 5, a method for controlling a network-enabled movable barrier operator according to some embodiments is shown. The operations in FIG. 5 may be performed by a user device, a server, and a movable barrier operator communicating over a network. In some embodiments, the operations in FIG. 5 may be performed by the server 210, the user device 220, and the movable barrier operator 230 described with reference to FIG. 2 herein.

In block 521, the movable barrier operator connects to a network and establishes a connection with the server. In some embodiments, the server may record the connection status and the connection time of the movable barrier operator in an MBO database. In block 501, the user device submits a registration request to the server. The registration request may comprise a user account identifier and an MBO identifier. In block 511, the server determines whether a registration condition is met based on a time window (e.g. between receipt of communications resulting from block 501 and block 521). If the time window is within a set time frame (e.g. 30 minutes, 60 minutes), the process proceeds to block 513.

If registration condition is not met in block 511, the server provides an action instruction to the user device and the user device displays an instruction to perform a specified action with a movable barrier operator via a user interface in block 502. In block 522, the movable barrier operator monitors and provides its status to the server. In block 512, the server uses the movable barrier status information to determine whether the specified action has been performed. In some embodiments, the server may instead receive information from the user device to determine whether the specified action has been performed. For example, the server may cause the light of the movable barrier operator to blink in a pattern and determine whether a camera of the user device has captured a video of the light pattern in block 512.

If specified action is not performed within a set time frame (e.g. 10 minutes, 20 minutes, etc.), the server instructs the user device to display a registration error message in block 503. The user may be invited to try again and/or verify that the MBO identifier was entered correctly.

If the specified action is determined to have been performed in block 512, the registration condition is determined to be met. In block 513, the server then associates the movable barrier operator identifier with the user account identifier to allow the user account associated with the user account identifier to control the movable barrier operator over a network. In block 513, the server also sends a registration confirmation to the user device and the user device displays the registration confirmation via a user interface in block 504.

After the movable barrier operator is associated with the user account, in block 505, the user device may begin to provide a GUI to control the movable barrier operator and/or display MBO status. When a user selects a status change in the GUI on the user device, the status change request is first sent to the server. The server may confirm in block 515 that the movable barrier operator has been properly registered to the user account in block 513. If registration is confirmed, the server forwards the status change command to the movable barrier operator, and the movable barrier operator changes its status (e.g. open garage door, close garage door, etc.) in block 523 in response to receiving the status change command.

The operations in FIG. 5 are provided as an example process according to some embodiments. In some embodiments, one or more operations or blocks may be omitted. For example, block 511 may be omitted and the server may be configured to send an instruction to perform a specified action regardless in response to receiving a registration request from a user device. In some embodiments, the MBO control interface may be provided on a device different from the user device used to register the movable barrier operator. For example, a user may register the MBO on a laptop computer and later use a mobile application to access the same user account to control the movable barrier operator.

Those skilled in the art will recognize that a wide variety of modifications, alterations, and combinations can be made with respect to the above-described embodiments without departing from the scope of the invention and that such modifications, alterations, and combinations are to be viewed as being within the ambit of the inventive concept.

What is claimed is:

1. A method for managing registration of a network-enabled movable barrier operator, the method comprising:
   receiving, from a user device, a user account identifier and a movable barrier operator identifier;
   providing, to the user device, an instruction to perform a specified action with a movable barrier operator associated with the movable barrier operator identifier;
   determining a registration condition is met upon detecting that the specified action has been performed; and
   upon the registration condition being met, associating the movable barrier operator identifier with the user account identifier to allow a user account associated with the user account identifier to control and/or monitor the movable barrier operator over a network;
   wherein the specified action comprises changing a state of a movable barrier coupled with the movable barrier operator.

2. The method of claim 1, wherein the specified action comprises changing a state of a light of the movable barrier operator.

3. The method of claim 1, wherein the specified action comprises using the user device to capture a light pattern produced by a light of the movable barrier operator.

4. The method of claim 1, wherein the specified action is detected by monitoring a status of the movable barrier operator over the network.

5. The method of claim 1, wherein the registration condition is further determined to be met if the movable barrier operator established a connection with a server within a predetermined timeframe prior to receiving the movable barrier operator identifier.

6. A system for managing registration of network-enabled movable barrier operators, the system comprising:
   communication circuitry configured to communicate with a plurality of user devices and a plurality of movable barrier operators;
   a user account database storing user accounts and associated movable barrier operator identifiers; and
   a processor coupled to the communication circuitry and the user account database, the processor being configured to:
   receive, from a user device, a user account identifier and a movable barrier operator identifier;
   provide, to the user device, an instruction to perform a specified action with a movable barrier operator associated with the movable barrier operator identifier;
   determine a registration condition is met upon detecting that the specified action has been performed; and
   upon the registration condition being met, associate the movable barrier operator identifier with the user account identifier to allow a user account associated with the user account identifier to control and/or monitor the movable barrier operator over a network; and
   wherein the specified action comprises changing a state of the movable barrier coupled with the movable barrier operator.

7. The system of claim 6, wherein the specified action comprises changing a state of a light of the movable barrier operator.

8. The system of claim 6, wherein the specified action comprises using the user device to capture a light pattern produced by a light of the movable barrier operator.

9. The system of claim 6, wherein the specified action is detected by monitoring a status of the movable barrier operator over the network.

10. The system of claim 6, wherein the registration condition is further determined to be met if the movable barrier operator established a connection with a server within a predetermined time frame prior to receiving the movable barrier operator identifier.

11. A non-transitory computer readable medium having stored thereon instructions that when executed by a controller circuit cause the controller circuit to perform operations for managing registration of network-enabled movable barrier operators, the operations comprising:
   receiving, from a user device, a user account identifier and a movable barrier operator identifier;
   providing, to the user device, an instruction to perform a specified action with a movable barrier operator associated with the movable barrier operator identifier;
   determining a registration condition is met upon detecting that the specified action has been performed; and
   upon the registration condition being met, associating the movable barrier operator identifier with the user account identifier to allow a user account associated with the user account identifier to control and/or monitor the movable barrier operator over a network; and
   wherein the specified action comprises changing a state of a movable barrier coupled with the movable barrier operator.

12. The non-transitory computer readable medium of claim 11, wherein the specified action comprises changing a state of a light of the movable barrier operator.

13. The non-transitory computer readable medium of claim 11, wherein the specified action is detected by monitoring a status of the movable barrier operator over the network.

14. The non-transitory computer readable medium of claim 11, wherein the registration condition is further determined to be met if the movable barrier operator established a connection with a server within a predetermined timeframe prior to receiving the movable barrier operator identifier.

* * * * *